US011174108B1

(12) United States Patent
Skarlupka et al.

(10) Patent No.: US 11,174,108 B1
(45) Date of Patent: *Nov. 16, 2021

(54) UNIVERSAL SORTER TRANSFER MODULE (71) Applicant: Skarlupka Mfg., Inc., White Lake, WI (US)

(72) Inventors: Donald Bruce Skarlupka, Deerbrook, WI (US); Brian A. Zdroik, White Lake, WI (US)

(73) Assignee: Skarlupka Mfg., Inc., White Lake, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/944,574

(22) Filed: Jul. 31, 2020

Related U.S. Application Data (63) Continuation-in-part of application No. 16/842,008, filed on Apr. 7, 2020, now Pat. No. 10,793,364.

(60) Provisional application No. 62/884,926, filed on Aug. 9, 2019.

(51) Int. Cl.
| | |
|---|---|
| *B65G 47/46* | (2006.01) |
| *B65G 39/20* | (2006.01) |
| *B65G 39/12* | (2006.01) |
| *B65G 23/08* | (2006.01) |
| *B65G 17/24* | (2006.01) |
| *B65G 15/22* | (2006.01) |
| *B65G 15/32* | (2006.01) |
| *B65G 17/08* | (2006.01) |

(52) U.S. Cl.
CPC ............ *B65G 47/46* (2013.01); *B65G 15/22* (2013.01); *B65G 15/32* (2013.01); *B65G 17/083* (2013.01); *B65G 17/24* (2013.01); *B65G 23/08* (2013.01); *B65G 39/12* (2013.01); *B65G 39/20* (2013.01)

(58) Field of Classification Search
CPC .... B65G 17/083; B65G 23/02; B65G 39/025; B65G 39/12; B65G 17/24
USPC ........................................ 198/779, 833, 842
See application file for complete search history.

(56) References Cited

U.S. PATENT DOCUMENTS

| | | |
|---|---|---|
| 3,550,756 A | 12/1970 | Kornylak |
| 3,858,473 A | 1/1975 | Bystron |
| 3,964,588 A | 6/1976 | Kornylak |
| | (Continued) | |

OTHER PUBLICATIONS

"Plastic Modular Belt Series uni QNB Type Ball," Ammeraal Beltech, Sep. 11, 2019.

(Continued)

*Primary Examiner* — Mark A Deuble
(74) *Attorney, Agent, or Firm* — Stiennon & Stiennon (57) ABSTRACT

A transfer module for a universal sorting conveyor has a ball belt looped around two pulley assemblies mounted to a frame and driven in a machine direction. Two bi-directional cross-belt assemblies are mounted to the frame to provide two smooth surfaced belts each supported on a roller bed. The belts extend beneath and engage the ball belt to advance a conveyed parcel in the cross direction. Each cross belt assembly has internal motorized drive rollers at the ends and a multiplicity of closely spaced idler rollers of smaller diameter than the drive rollers which define the roller bed, with a spacing between the idlers rollers of less than one inch. The ball belt has a plurality of plastic link bodies pivotally connected to one another, each with a downwardly opening socket having downwardly facing entry notches which allow distortion of the socket for entry of a ball therein.

13 Claims, 7 Drawing Sheets

(56) References Cited

U.S. PATENT DOCUMENTS

| | | | |
|---|---|---|---|
| 3,967,720 | A | 7/1976 | Arieh |
| 5,238,099 | A | 8/1993 | Schroeder et al. |
| 5,240,102 | A | 8/1993 | Lucas |
| 5,411,279 | A | 5/1995 | Magid |
| 6,152,854 | A | 11/2000 | Carmein |
| 6,540,060 | B1 | 4/2003 | Fargo et al. |
| 6,758,323 | B2 | 7/2004 | Costanzo |
| 6,883,659 | B2 | 4/2005 | Muchalov |
| 7,021,454 | B2 | 4/2006 | Ozaki et al. |
| 7,147,097 | B2 | 12/2006 | Lemm |
| 7,237,670 | B1 | 7/2007 | Ryan |
| 7,249,669 | B2 | 7/2007 | Fourney |
| 7,284,653 | B2 | 10/2007 | Fourney et al. |
| 7,344,018 | B2 | 3/2008 | Costanzo et al. |
| 7,588,137 | B2 | 9/2009 | Fourney |
| 8,172,069 | B2 | 5/2012 | Prakasam |
| 8,915,353 | B2 | 12/2014 | Fourney |
| 9,156,629 | B2 | 10/2015 | Costanzo et al. |
| 10,793,364 | B1 * | 10/2020 | Skarlupka .............. B65G 17/24 |
| 2006/0260917 | A1 * | 11/2006 | Ozaki .................... B65G 17/24 |
| | | | 198/853 |
| 2007/0089970 | A1 * | 4/2007 | Damkjaer .............. B65G 17/40 |
| | | | 198/853 |
| 2008/0023301 | A1 | 1/2008 | Fourney |
| 2014/0251765 | A1 * | 9/2014 | Weichbrodt ........... B65G 13/02 |
| | | | 198/780 |
| 2014/0346008 | A1 * | 11/2014 | Hoynash .............. B65G 1/0478 |
| | | | 198/347.1 |
| 2018/0257110 | A1 | 9/2018 | Lundahl et al. |
| 2018/0257872 | A1 | 9/2018 | Kuhn |
| 2019/0152720 | A1 | 5/2019 | Kuhn |

OTHER PUBLICATIONS

"Uni QNB Ball Technical Manual," Ammeraal Beltech, Jan. 2018.
"Uni QNB Ball: Superior Performance in All Directions," Ammeraal Beltech, Feb. 2017.
"Conveyor Products Catalog: Edition 2," Dotmar Engineering Plastics Limited, pp. 1, 28-30, Jan. 2016. "System Plast TM Unit Material Handling Conveyor Solutions," Regal-Beloit Corporation, 2015.
"Designed for Diversity: Multidirectional Roller Top Belt Series 2253 RT: Appendix to General Engineering Manual," Regal-Beloit Corporation, 2016.
"System Plast TM: Unit Material Handling Conveyor Solutions," Regal-Beloit Corporation, 2015.
"Metal Rollers 1.37" Dia. x .065" Wall Thickness—7/16" Hex Shaft," Ralphs-Pugh Co., Benicia, CA, Copyright 2019, https://www.ralphs-pugh.com/metal_rollers/137-065-716HM.html, downloaded at least as early as Jul. 31, 2020.

* cited by examiner

UNIVERSAL SORTER TRANSFER MODULE

CROSS REFERENCES TO RELATED APPLICATIONS

This application is a continuation-in-part of U.S. application Ser. No. 16/842,008, filed Apr. 7, 2020, which claims the benefit of priority of U.S. provisional App. No. 62/884,926, filed Aug. 9, 2019, the disclosures of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to conveyors generally, and more particularly to sortation modules for conveyors which can divert conveyed products in a desired manner. Ball belt conveyors employ a modular belt comprised of pin-connected modular plastic links. Each link incorporates a linear array of freely rotating balls. When the ball belt passes over a fixed support area, the balls are caused to rotate, and the conveyed product is advanced at a speed greater than the speed of the belt. By placing two parallel auxiliary belts beneath the ball belt in contact with the balls, and running the belts in directions perpendicular to the ball belt's travel, the product can be diverted in a direction perpendicular to the ball belt travel direction. In conventional conveyors, the auxiliary belts are sometimes supported on fixed wear strips. However, with heavier packages and wider cross-direction expanses, the friction between the auxiliary belts and the wear strips can be excessive and can impede conveyor operation.

What is needed is a conveyor arrangement which will allow significant cross-direction widths with heavier conveyed objects.

SUMMARY OF THE INVENTION

A universal sorting conveyor transfer module has a ball belt looped around two pulley assemblies mounted to a frame and driven in a machine direction. One or two bi-directional cross-belt assemblies are mounted to the frame to provide smooth surfaced belts which extend beneath the ball belt and which, when activated, move the balls of the ball belt to advance a conveyed product in the cross direction. Each cross belt assembly has motorized drive rollers at the ends and a multiplicity of closely spaced idler rollers of smaller diameter than the drive rollers which define a roller bed, with the distance between idler rollers being less than one inch. Each cross belt extends beneath the ball belt so as to engage the plurality of balls of the ball belt, such that when the cross belt is driven in the cross machine direction, an object supported on the ball belt is conveyed in the cross direction. The ball belt has a plurality of plastic link bodies pivotally connected to one another, and wherein each link body has a downwardly opening socket with downwardly facing entry notches which allow distortion of the socket for entry of a ball therein.

It is an object of the present invention to provide a conveyor arrangement utilizing a ball belt which will allow significant cross-direction widths with heavy conveyed objects.

Further objects, features and advantages of the invention will be apparent from the following detailed description when taken in conjunction with the accompanying drawings.

DESCRIPTION OF THE PREFERRED EMBODIMENTS

Figure 1:
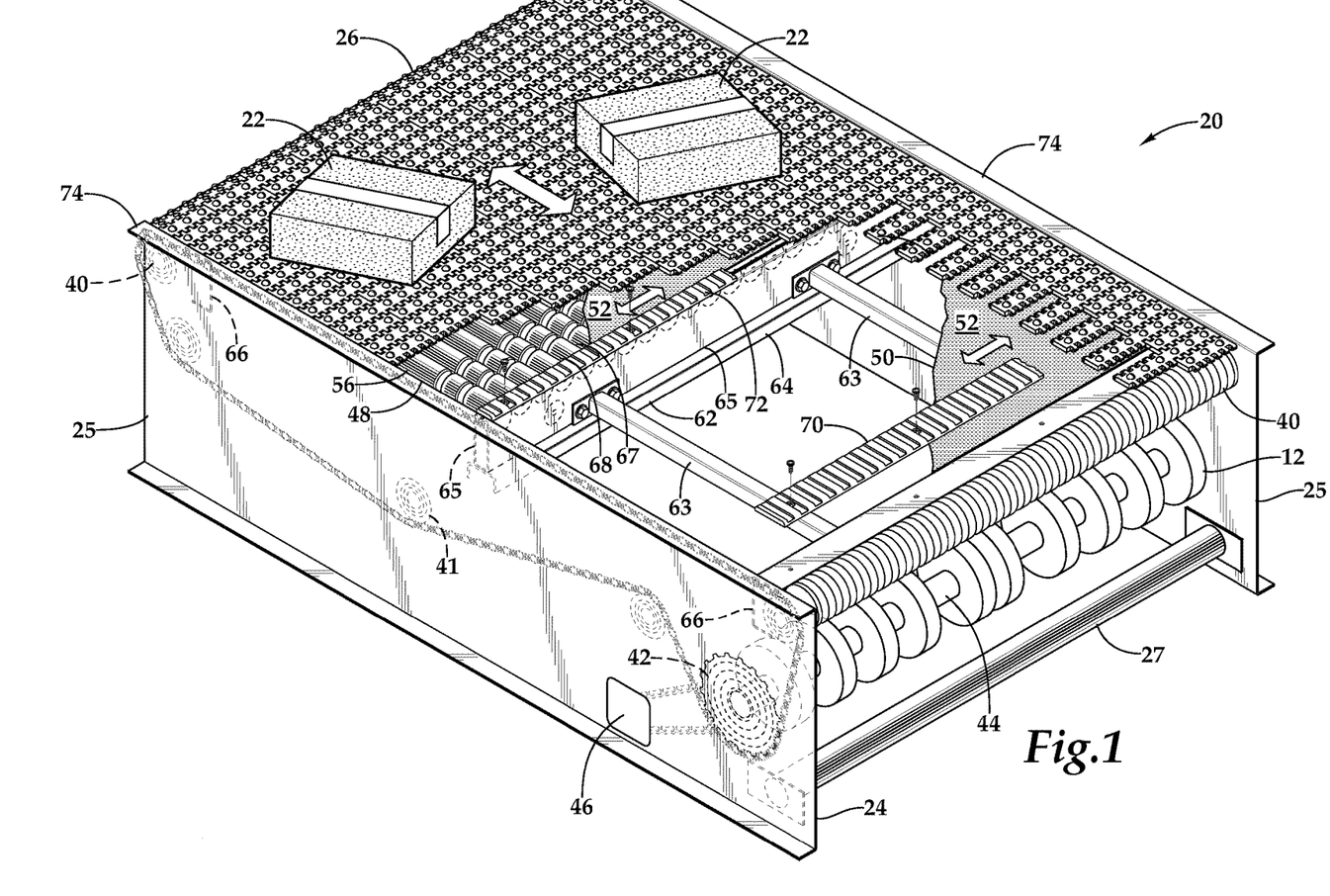
FIG. 1 is a fragmentary isometric view broken away in section of the conveyor arrangement of this invention.

Referring more particularly to FIGS. 1-11, wherein like numbers refer to similar parts, a conveyor arrangement 20 is shown in FIG. 1 which can serve as a universal sorter module within a larger conveyor system. The conveyor arrangement 20 may be operated to convey objects 22, such as a corrugated cardboard carton, in a machine direction, a counter-machine direction, or in a cross-machine direction to one side or the other.

Figure 10:
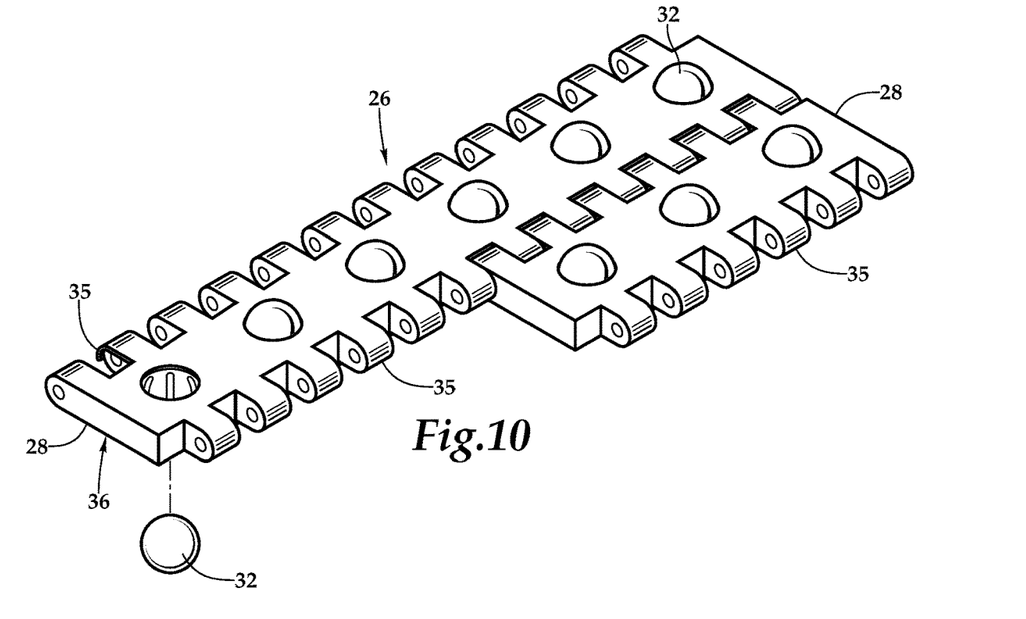
FIG. 10 is an exploded isometric view of a fragment of the ball belt of the conveyor arrangement of FIG. 1.
Figure 11:
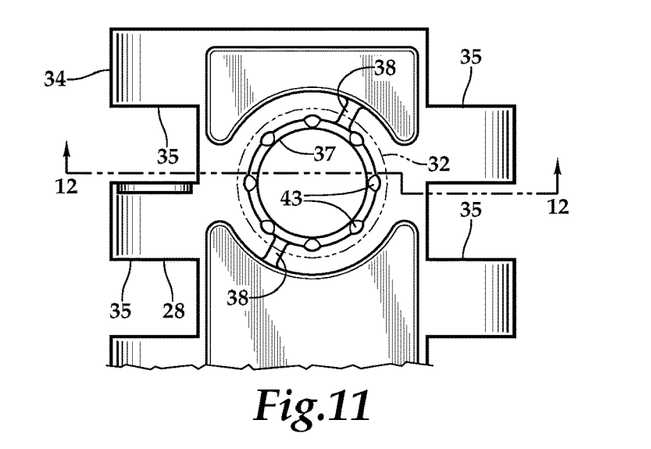
FIG. 11 is a fragmentary bottom plan view of a link of the ball belt of FIG. 10 with the location of the ball shown in broken lines.
Figure 12:
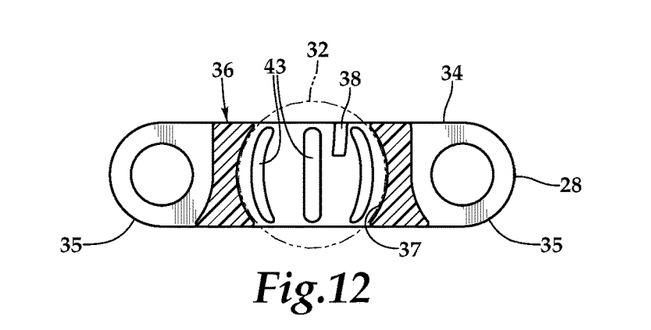
FIG. 12 is a cross-sectional view of the link of FIG. 11 taken along section line 12-12, with the location of the ball shown in broken lines.

The conveyor arrangement 20 has a frame 24 which extends to engage some support surface such as the floor. The frame 24 has side members 25 connected by cross members 27, 64. A ball belt 26 is mounted to the frame 24 for advancement in a machine direction. The ball belt 26 may be the uni QNB ball belt, available from Ammeraal Beltech Holding B.V. P.O. Box 38, 1700 AA Heerhugowaard, The Netherlands. The ball belt 26 is comprised of multiple modular plastic links 28 having knuckles 35 which interdigitate with adjoining link knuckles with pins 28 which extend in a cross machine direction, as shown somewhat schematically in FIG. 4. A plurality of freely rotating plastic spheres or balls 32 are mounted to the links. Each ball 32 is about one-half inch in diameter. As shown in FIGS. 10-12, each link has a plastic link body 34 with a lower surface 36. Each link body 34 has a downwardly opening socket 37. The socket 37 has two downwardly facing entry notches 38 which allow distortion of the socket for entry of the ball 32. The interior generally semispherical surface 39 of the socket 37 is the portion of the link body 34 which makes contact with the ball 32, and may be provided with vertically extending relief channels 43 which reduce the surface area contact with the balls and hence resistance to rotation of the balls. The balls 32 extend beneath the lower surface 36 where they may be engaged by an underlying element and be rotated to advance the article supported on the ball belt 26. As shown in FIG. 1, the ball belt 26 passes over pulley assemblies 40 on cross axles mounted to the frame 24, including a take-up pulley assembly 41 which may have a spring-loading apparatus (not shown). The ball belt 26 is engaged by a number of sprockets 42 mounted to a cross axle 44 supported on the frame 24. (In FIGS. 1 and 4 for simplicity, some of the sprockets are shown as circular outlines, omitting the individual teeth of the sprockets.) The pulleys of the pulley assemblies 40 and the sprockets 42 are provided with appropriate relief so that the modular links 28 may be engaged while having clearance for the balls 32. The cross axle 44 is driven by a drive motor 46. The motor 46 drives the ball belt 26 in a machine direction either forward or in reverse.

Figure 2:
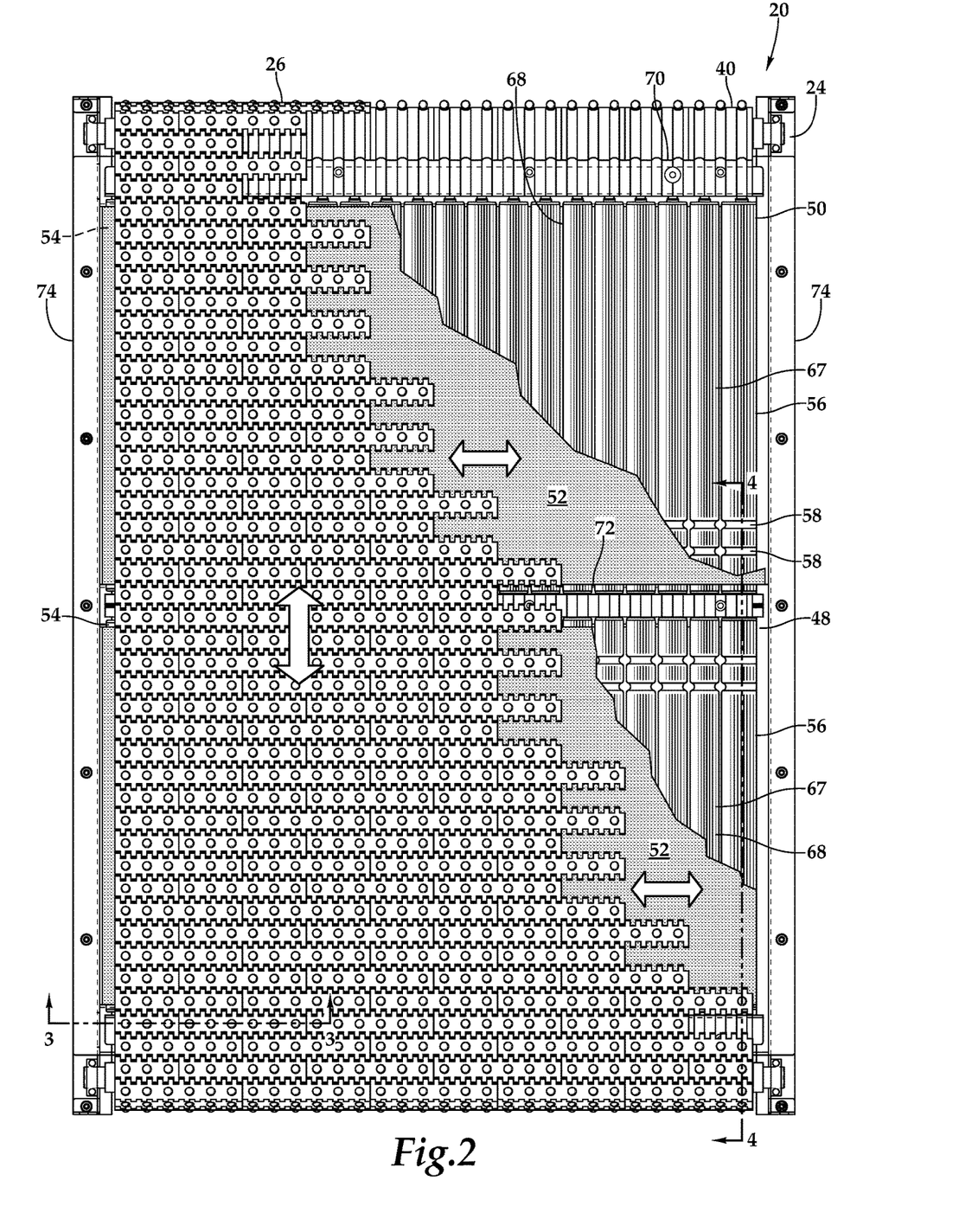
FIG. 2 is a top plan view, partially broken away in section, of the conveyor arrangement of FIG. 1.
Figure 4:
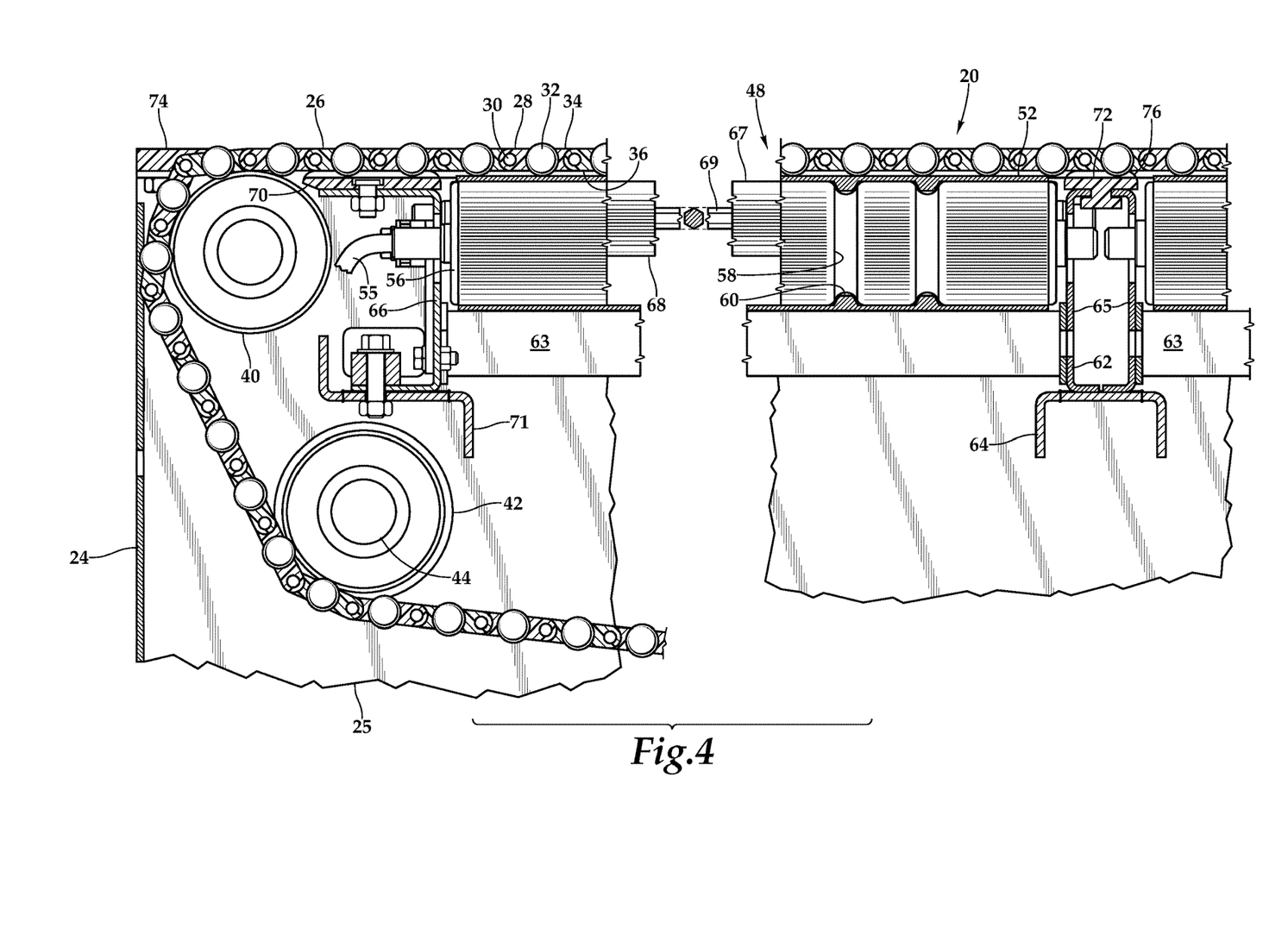
FIG. 4 is fragmentary cross-sectional view of the conveyor arrangement of FIG. 2 taken along section line 4-4.

As shown in FIG. 2, two bi-directional cross belt assemblies 48, 50 are mounted to the frame 24 to extend in the cross-machine direction immediately below the ball belt 26. Each of the cross belt assemblies 48, 50 has a smooth surface two-ply polyester belt 52 with rigid weft with a 74 durometer anti-static PVC top cover which loops around a first drive roller 54 and a second drive roller 56. The belt thus minimally stretches, and has advantageous traction to drive the balls on the ball belt. The drive rollers 54, 56 may be, for example, PULSEROLLER SENERGY 24V DC motorized conveyor rollers, manufactured by Kyowa Mfg. Ltd., of Kasai City, Japan. Motorized conveyor rollers include a built-in motor and built-in reduction gear all of which are retained within the roller itself, thus offering a very compact form which is suitable for the cross belt assemblies which are themselves advantageously positioned entirely within the loop of the ball belt 26. Power is supplied to the drive rollers by power cables 55, as shown in FIG. 4. Due to the limited volume available within the form of a roller there is an upper limit on the torque available in this type of drive roller. Prior art ball belt conveyor systems which rely on the transverse belts being supported by a glide plate are limited in the loads they can support by the maximum force which the motorized conveyor rollers can impart to the flat belt. As the package load increases, the friction between the transverse belt and the glide plate increases until it can no longer effectively operate. The roller beds used within the transverse conveyor arrangements of this conveyor offer much lower friction with respect to the belt, enabling substantially higher loads and conveyor width.

Figure 3:
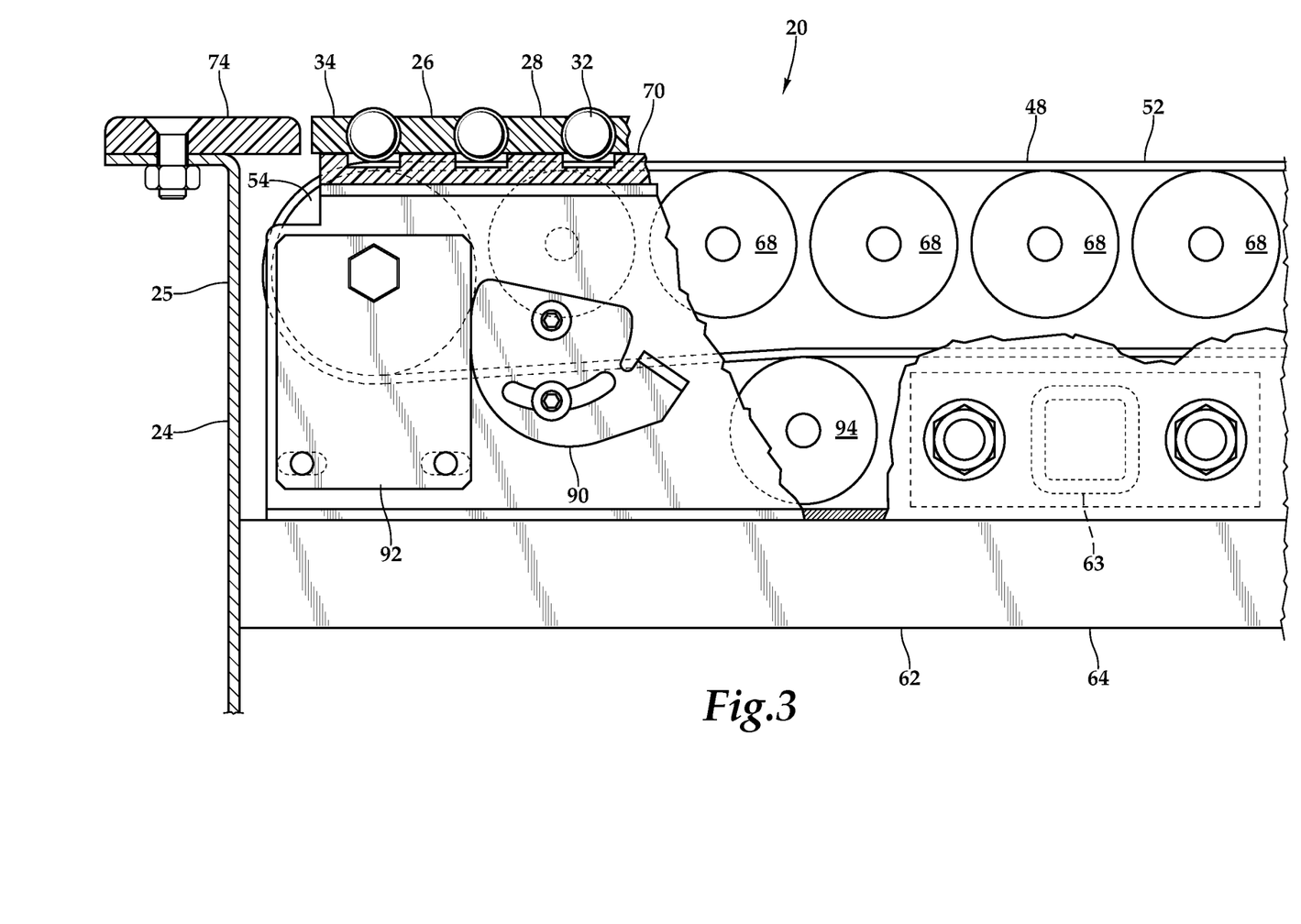
FIG. 3 is a fragmentary cross-sectional view of the conveyor arrangement of FIG. 2 taken along section line 3-3.

The belt 52 is an endless belt with a finger splice belt seam. The drive rollers 54, 56 of a particular cross belt assembly are synched so that both drive a belt simultaneously and can serve to drive the belt in forward or reverse. The drive rollers 54, 56 have grooves 58 which receive V-protrusions 60 which extend inwardly from the looped belt 52 so as to retain the belt in position. The drive rollers 54, 56 may be, for example, 1.9 inches in diameter, and mounted by sealed ball bearings to a subframe 62. The frame 24 has a central element 64 which is an inverted U-channel extending between the side members 25. The subframe 62 for each cross belt assembly 48, 50 has two side elements 65, 66 which are each U-channel members. The side elements 66 are mounted to cross members 71 of the frame 24 near the roller belt pulley assemblies 40, while the side elements 65 are mounted to the frame central element 64. Intermediate subframe members 63 extend between the side elements 65, 66 of each subframe 62, as shown in FIG. 1. As shown in FIG. 3, the cross belt assemblies 48, 50 may be provided with a belt-tensioning cam 90 mounted to one of the subframe side elements 65, 66 to urge a plate 92 to which a drive roller 54, 56 is mounted, thereby providing a mechanism to adjust the tension of the belts 52. The return runs of the belts 52 pass over an outside roller 94.

Although not shown, the subframe 62 may be a removable arrangement which sits in the bed of the frame 24, with a knob which fastens the subframe in place, but which allows the entire subframe and cross belt assembly to be removed for servicing.

Each belt 52 travels within a cross belt assembly over a roller bed 67 defined by closely spaced idler rollers 68. In the 30-inch bed there are 18 idler rollers between the two drive rollers. Each cylindrical idler roller 68 is mounted at both ends by ABEC 1 sealed ball bearing cartridges which are swedged to cylindrical tubes forming the roller surfaces. As shown in FIG. 4, the bearings are supported on $7/16$ inch hex steel shafts 69 which are mounted to the auxiliary conveyor subframe central element 65 and side element 66. The hex shafts 69 may have threaded axial openings at the ends allowing bolts to connect the shafts to the side element 66, the hex shafts then further serve to stiffen the subframe 62. The internal hex steel shafts 69 extend through and stiffen the idler roller to resist distortion in the idler roller when loads are applied. The two U-channel central elements 65 face one another and are fixed to the frame cross member 64 as shown in FIG. 4. The idler rollers also have grooves positioned to receive the V protrusions 60 on the belt. The idler rollers 68 are significantly smaller in diameter than the driver rollers 54, 56, for example, with drive rollers of 1.9 inches in diameter, the idler rollers may be $1 3/8$ inches in diameter, hence the idler rollers are less than $3/4$ of the diameter of the drive rollers. The spacing between the idler rollers should be less than one inch, and preferably as close as can be positioned so the idler rolls do not interfere with one another due to wobble, for example about $1/8$ inch. The horizontal axes about which the idler rollers turn are more than $1/8$ inch above the horizontal axes about which the drive rollers 54, 56 turn. The smaller diameter idler rollers 68 permit more idler rollers to be positioned beneath a belt 52 to provide adequate support for the ball belt 26 which passes over the belt 52 and which carries a conveyed object 22. As shown in FIG. 2, the roller beds 67 defined by each of the cross belt assemblies 48, 50 can extend 30 inches in the cross direction without inordinate friction, even while supporting significant weight of a conveyed object, even ones weighing 100 pounds. Moreover, the wide expanse of the conveyor arrangement 20, although it can support objects as small as 6"×6"×$1/2$", can also accommodate cartons as large as 36"×24"×18". Product within these limitations can be conveyed, including cartons, boxes, parcels, pouches, and bulk mail sacks.

The cross belts 52 are supported by the idler roller beds 67, and even though the cross belts 52 are not supported directly by a roller at every point, the close spacing and narrow diameter of the idler rollers and the bridging of the belt between the crowns of the idler rollers results in a conveying arrangement which adequately drives the balls of the ball belt while given adequate support to heavier conveyed objects 22.

Figure 7:
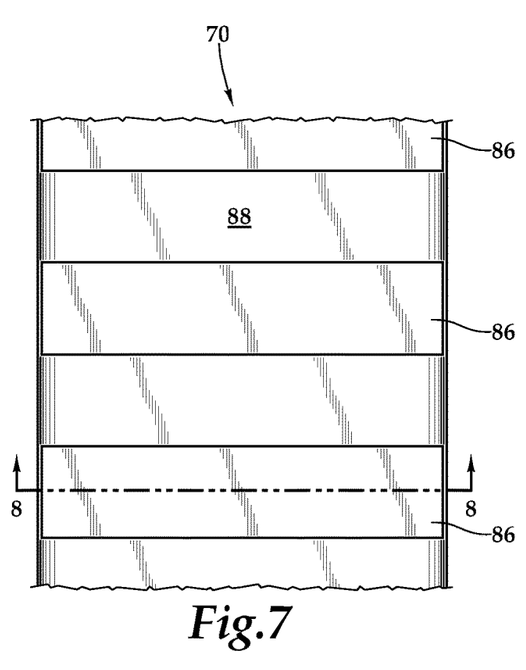
FIG. 7 is a fragmentary top plan view of an end glide plate of the conveyor arrangement of FIG. 1.
Figure 8:
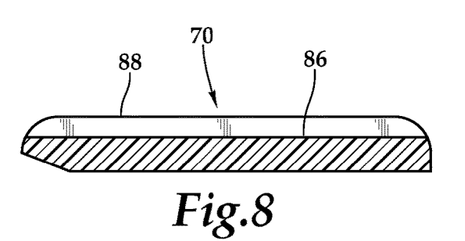
FIG. 8 is a cross-sectional view of the end glide plate of FIG. 7 taken along section line 8-8.

As shown in FIGS. 3 and 4, glide plates may be provided at transitions within the conveyor arrangement. End glide plates 70 are mounted to the side elements 66 of the subframe 62 of the two cross belt assemblies 48, 50 to support the ball belt 26 in the gaps between the edges of a cross belt assembly and a belt pulley assembly 40. As shown in FIGS. 7 and 8, each end glide plate 70 has a plurality of machine direction slots 86 relieved below the glide plate upper surface 88 such that the balls 32 mounted to the link bodies 31 pass through the glide plate slots without engaging the glide plate. The end glide plates 70 are radiused to ease the entry of the link bodies 31 onto the glide plates. As shown in FIGS. 4 and 8, the undersides of the end glide plates 70 are cut away to allow the glide plates to be positioned more closely to the drive sprockets 42 without engaging them.

Figure 5:
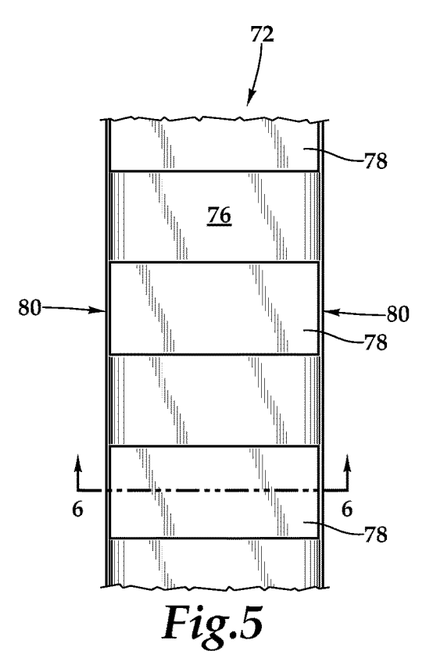
FIG. 5 is a fragmentary top plan view of an intermediate glide plate of the conveyor arrangement of FIG. 1.
Figure 6:
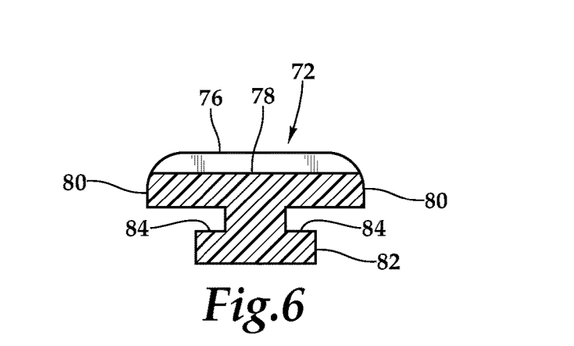
FIG. 6 is a cross-sectional view of the intermediate glide plate of FIG. 5 taken along section line 6-6.

A central glide plate 72 is mounted to the central element 64 of the subframe 62 to bridge the gap between the two cross belt assemblies 48, 50. As shown in FIGS. 5 and 6, the central guide plate 72 has an upper surface 76 positioned to engage the lower surfaces 36 of the link bodies 34 of the ball belt. The central guide plate 72 has a plurality of machine direction slots 78 relieved below the glide plate upper surface 76 such that the balls 32 mounted to the link bodies 31 pass through the glide plate slots without engaging the glide plate. The slots 78 extend between parallel faces 80 of the glide plate and the glide plate is radiused between each of the parallel faces and the glide plate upper surface 76, as shown in FIG. 6, easing the link bodies onto the upper surface of the glide plate as they move across the glide plate 72. The central guide plate 72 is provided with an inverted T-shaped element 82 which defines two parallel slots which engage with the U-channel members 65 of the central element 64 of the subframe 62.

The end and central glide plate upper surfaces are at the same height as the upper surface of the cross belts 52. As shown in FIGS. 1 and 3, side glide plates 74 are mounted to the side members 25 of the conveyor frame. The side glide plates 74 may be formed of UHMW and have an upper surface which is about even with the upper surfaces of the modular links 28 of the ball belt 26.

In operation, the conveyor arrangement 20 serves as a transfer module for a universal sorter assembly. It may receive input conveyed objects going in the machine direction, and, with the cross belt assemblies 48, 50 stationary, the objects will continue along the ball belt in the machine direction to leave the conveyor arrangement 20. Either one of the cross belt assemblies 48, 50 may be activated to move the conveyed object 22 in the cross direction to either side of the conveyor. Moreover, with one cross belt assembly driven in one direction, and the other cross belt assembly driven in the other, a conveyed object 22 can be rotated about a vertical axis as it is conveyed along the ball belt 26 so as to present a different orientation when it leaves the conveyor.

Figure 9:
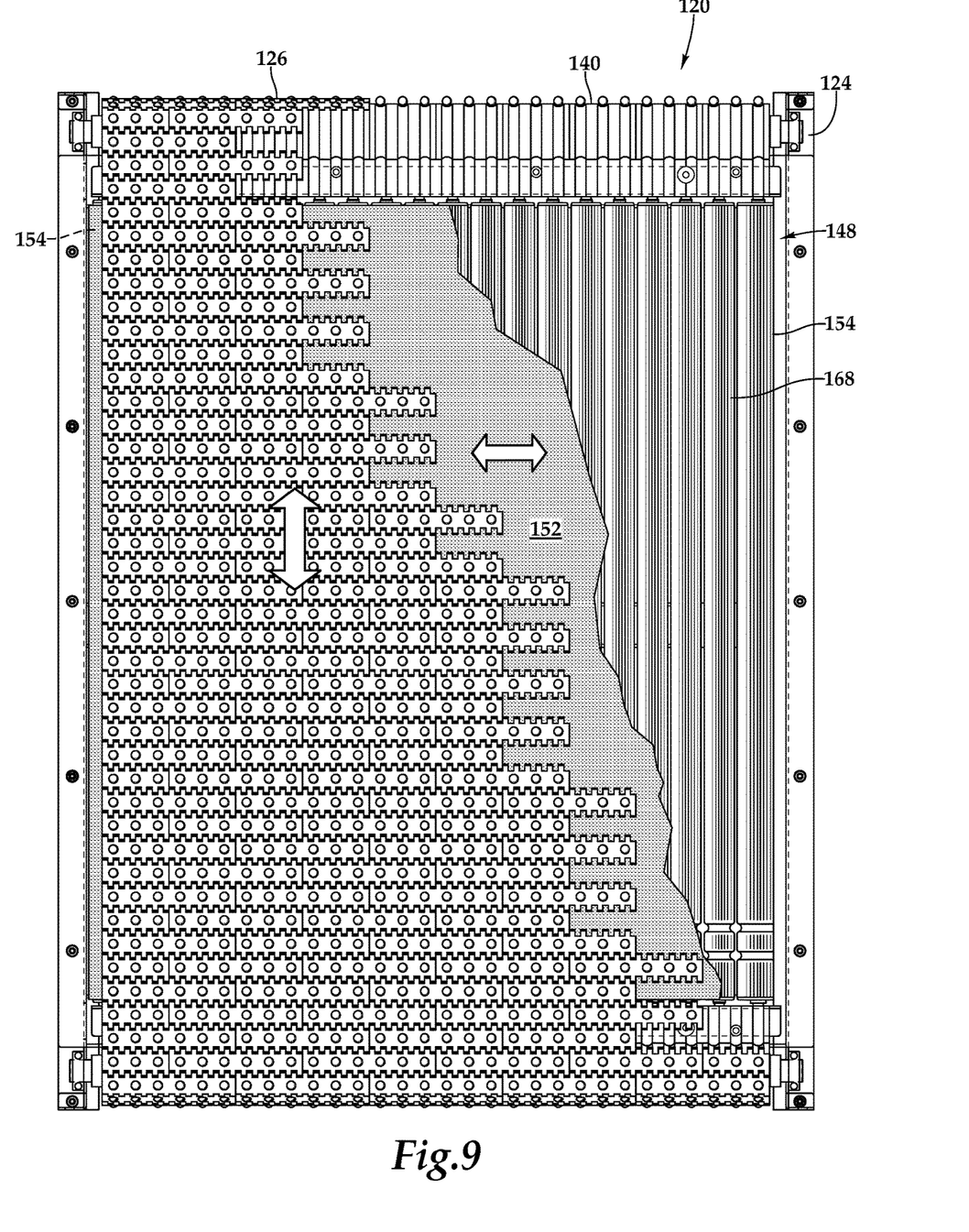
FIG. 9 is a top plan view, partially broken away in section, of an alternative embodiment conveyor arrangement of this invention having a single cross belt conveyor.

An alternative embodiment conveyor arrangement 120 is similar to the conveyor 20, but has only a single cross belt assembly. The conveyor arrangement 120 has a frame 124 with a ball belt 126 mounted to the frame 124 for advancement in a machine direction. The ball belt 126 passes over pulley assemblies 140 on cross axles mounted to the frame 124. The ball belt 126 is engaged by a number of sprockets (not shown) mounted to a cross axle supported on the frame 124. The cross axle is driven by a motor (not shown) which drives the ball belt 126 in a machine direction either forward or in reverse. The conveyor arrangement 120 has a single bi-directional cross belt assembly 148 mounted to the frame 124 to extend in the cross-machine direction immediately below the ball belt 26. The cross belt assembly 148 has a smooth surface monofilament PVC belt 152 which loops around end drive rollers 154 and intermediate idler rollers of smaller diameter, as in the arrangement 20.

It is understood that the invention is not limited to the particular construction and arrangement of parts herein illustrated and described, but embraces all such modified forms thereof as come within the scope of the following claims.

We claim:

1. A conveyor arrangement comprising:
    a frame;
    two first rolls mounted to the frame;
    a ball belt looped around the two first rolls, the ball belt having a plurality of freely spinning balls mounted thereto to project upwardly to engage an object it is desired to convey;
    a drive engaged with the ball belt to advance the ball belt in a machine direction;
    a subframe mounted to the frame extending beneath the ball belt;
    a first drive roller mounted to the subframe beneath the ball belt to rotate about an axis parallel to the machine direction;
    a plurality of idler rollers mounted to the subframe beneath the ball belt to define a roller bed together with the first drive roller, wherein gaps are defined between the idler rollers, the gaps being less than one inch, wherein the idler rollers are rotable about axes which are parallel to the first drive roller axis, and wherein a gap is defined between the first drive roller and a closest one of the plurality of idler rollers which is less than one inch and less than a radius of said closest one of the plurality of idler rollers; and
    a cross belt looped around the first drive roller and the plurality of idler rollers to be driven by the first drive roller in a cross machine direction which is perpendicular to the machine direction, wherein the cross belt is supported on the roller bed and extends beneath the ball belt so as to engage the plurality of balls of the ball belt passing thereover, such that when the cross belt is driven in the cross machine direction, an object supported on the ball belt is conveyed in a cross direction perpendicular to the machine direction.

2. The conveyor arrangement of claim 1 wherein the ball belt comprises a plurality of plastic link bodies pivotally connected to one another, and wherein each link body has a downwardly opening socket with two downwardly facing entry notches which allow distortion of the socket for entry of a ball therein.

3. The conveyor arrangement of claim 1 wherein the first drive roller is a 24V DC motorized conveyor roller.

4. The conveyor arrangement of claim 1 wherein each idler roller has a shaft which extends therethrough which is mounted to the conveyor frame.

5. A conveyor arrangement comprising:
    a frame;
    two first rolls mounted to the frame;
    a ball belt looped around the two first rolls, the ball belt having a plurality of freely spinning balls mounted thereto to project upwardly to engage an object it is desired to convey;
    a drive engaged with the ball belt to advance the ball belt in a machine direction;
    a subframe mounted to the frame extending beneath the ball belt;
    a first drive roller mounted to the subframe beneath the ball belt;
    a plurality of closely spaced idler rollers mounted to the subframe beneath the ball belt to define a roller bed together with the first drive roller, the idler rollers being spaced less than one inch apart; and a cross belt looped around the first drive roller and the plurality of idler rollers to be driven by the first drive roller in a cross machine direction which is perpendicular to the machine direction, wherein the cross belt is supported on the roller bed and extends beneath the ball belt so as to engage the plurality of balls of the ball belt passing thereover, such that when the cross belt is driven in the cross machine direction, an object supported on the ball belt is conveyed in a cross direction perpendicular to the machine direction; and wherein the cross belt is a smooth surface two-ply polyester belt with rigid weft.

6. A conveyor arrangement comprising:

a frame;

two first rolls mounted to the frame;

a ball belt looped around the two first rolls, the ball belt having a plurality of freely spinning balls mounted thereto to project upwardly to engage an object it is desired to convey;

a drive engaged with the ball belt to advance the ball belt in a machine direction;

a subframe mounted to the frame extending beneath the ball belt;

a first drive roller mounted to the subframe beneath the ball belt, wherein the first drive roller is a motorized conveyor roller in which the drive is contained within the roller;

a plurality of spaced idler rollers mounted to the subframe beneath the ball belt to define a roller bed together with the first drive roller; and a cross belt looped around the first drive roller and the plurality of idler rollers to be driven by the first drive roller in a cross machine direction which is perpendicular to the machine direction, wherein the cross belt is supported on the roller bed and extends beneath the ball belt so as to engage the plurality of balls of the ball belt passing thereover, such that when the cross belt is driven in the cross machine direction, an object supported on the ball belt is conveyed in a cross direction perpendicular to the machine direction; and wherein the ball belt comprises a plurality of plastic link bodies pivotally connected to one another, and wherein each link body has a downwardly opening socket with two downwardly facing entry notches which allow distortion of the socket for entry of a ball therein.

7. A conveyor arrangement comprising:

a frame;

two first rolls mounted to the frame;

a ball belt looped around the two first rolls, the ball belt having a plurality of freely spinning balls mounted thereto to project upwardly to engage an object it is desired to convey;

a drive engaged with the ball belt to advance the ball belt in a machine direction;

a subframe mounted to the frame extending beneath the ball belt;

a first drive roller mounted to the subframe beneath the ball belt, wherein the first drive roller is a motorized conveyor roller in which the drive is contained within the roller;

a plurality of spaced idler rollers mounted to the subframe beneath the ball belt to define a roller bed together with the first drive roller; and a cross belt looped around the first drive roller and the plurality of idler rollers to be driven by the first drive roller in a cross machine direction which is perpendicular to the machine direction, wherein the cross belt is supported on the roller bed and extends beneath the ball belt so as to engage the plurality of balls of the ball belt passing thereover, such that when the cross belt is driven in the cross machine direction, an object supported on the ball belt is conveyed in a cross direction perpendicular to the machine direction; and wherein the cross belt is a smooth surface two-ply polyester belt with rigid weft.

8. A conveyor arrangement comprising:

a frame;

two first rolls mounted to the frame;

a ball belt looped around the two first rolls, the ball belt having a plurality of freely spinning balls mounted thereto to project upwardly to engage an object it is desired to convey, wherein the ball belt comprises a plurality of plastic link bodies pivotally connected to one another, and wherein each link body has a downwardly opening socket with two downwardly facing entry notches which allow distortion of the socket for entry of a ball therein;

a drive engaged with the ball belt to advance the ball belt in a machine direction;

a subframe mounted to the frame extending beneath the ball belt;

a first drive roller mounted to the subframe beneath the ball belt;

a plurality of spaced idler rollers mounted to the subframe beneath the ball belt to define a roller bed together with the first drive roller; and a cross belt looped around the first drive roller and the plurality of idler rollers to be driven by the first drive roller in a cross machine direction which is perpendicular to the machine direction, wherein the cross belt is supported on the roller bed and extends beneath the ball belt so as to engage the plurality of balls of the ball belt passing thereover, such that when the cross belt is driven in the cross machine direction, an object supported on the ball belt is conveyed in a cross direction perpendicular to the machine direction.

9. The conveyor arrangement of claim 8 wherein the first drive roller is a 24V DC motorized conveyor roller.

10. The conveyor arrangement of claim 8 wherein the spacing between the idler rollers of the roller bed is less than one inch.

11. The conveyor arrangement of claim 8 wherein each idler roller has a shaft which extends therethrough which is mounted to the conveyor frame.

12. The conveyor arrangement of claim 8 wherein the cross belt is a smooth surface two-ply polyester belt with rigid weft.

13. The conveyor arrangement of claim 8 wherein the idler rollers are spaced from one another to define gaps, the gaps being less than one inch.

* * * * *